(12) United States Patent
Horiguchi

(10) Patent No.: US 6,799,111 B2
(45) Date of Patent: Sep. 28, 2004

(54) CONTROL APPARATUS AND CONTROL METHOD OF AUTOMATIC TRANSMISSION FOR VEHICLE

(75) Inventor: Masanobu Horiguchi, Atsugi (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/325,957

(22) Filed: Dec. 23, 2002

(65) Prior Publication Data
US 2003/0125862 A1 Jul. 3, 2003

(30) Foreign Application Priority Data
Dec. 27, 2001 (JP) .......................................... 2001-397724

(51) Int. Cl.$^7$ .............................................. G06F 17/00
(52) U.S. Cl. ............................................ 701/65; 701/51
(58) Field of Search ............................. 701/65, 51, 67; 477/92, 110, 94, 120, 155, 904, 39, 114; 475/125

(56) References Cited

U.S. PATENT DOCUMENTS

| 5,390,117 A | * | 2/1995 | Graf et al. ...................... 701/57 |
| 5,655,995 A | * | 8/1997 | Kondo et al. ................ 477/155 |
| 5,890,993 A | * | 4/1999 | Horiguchi et al. ............. 477/94 |
| 6,510,374 B1 | * | 1/2003 | Saotome et al. .............. 701/80 |
| 2001/0003807 A1 | * | 6/2001 | Lee ............................... 701/51 |
| 2001/0005805 A1 | * | 6/2001 | Saotome et al. .............. 701/67 |

FOREIGN PATENT DOCUMENTS

JP    2000-035117 A    2/2000

* cited by examiner

Primary Examiner—Marthe Y. Marc-Coleman
(74) Attorney, Agent, or Firm—Foley & Lardner LLP

(57) ABSTRACT

Grade resistance Ri is calculated based on a driving force, an acceleration degree and rolling/air resistance. When a brake switch is OFF, a down-slope is judged using the grade resistance Ri directly as a value Rif for down-slope judgment. On the contrary, when braking is performed where the brake switch is ON, a minimum value of the grade resistance Ri is peak held, to set the peak held value as the value Rif for down-slope judgment.

16 Claims, 3 Drawing Sheets

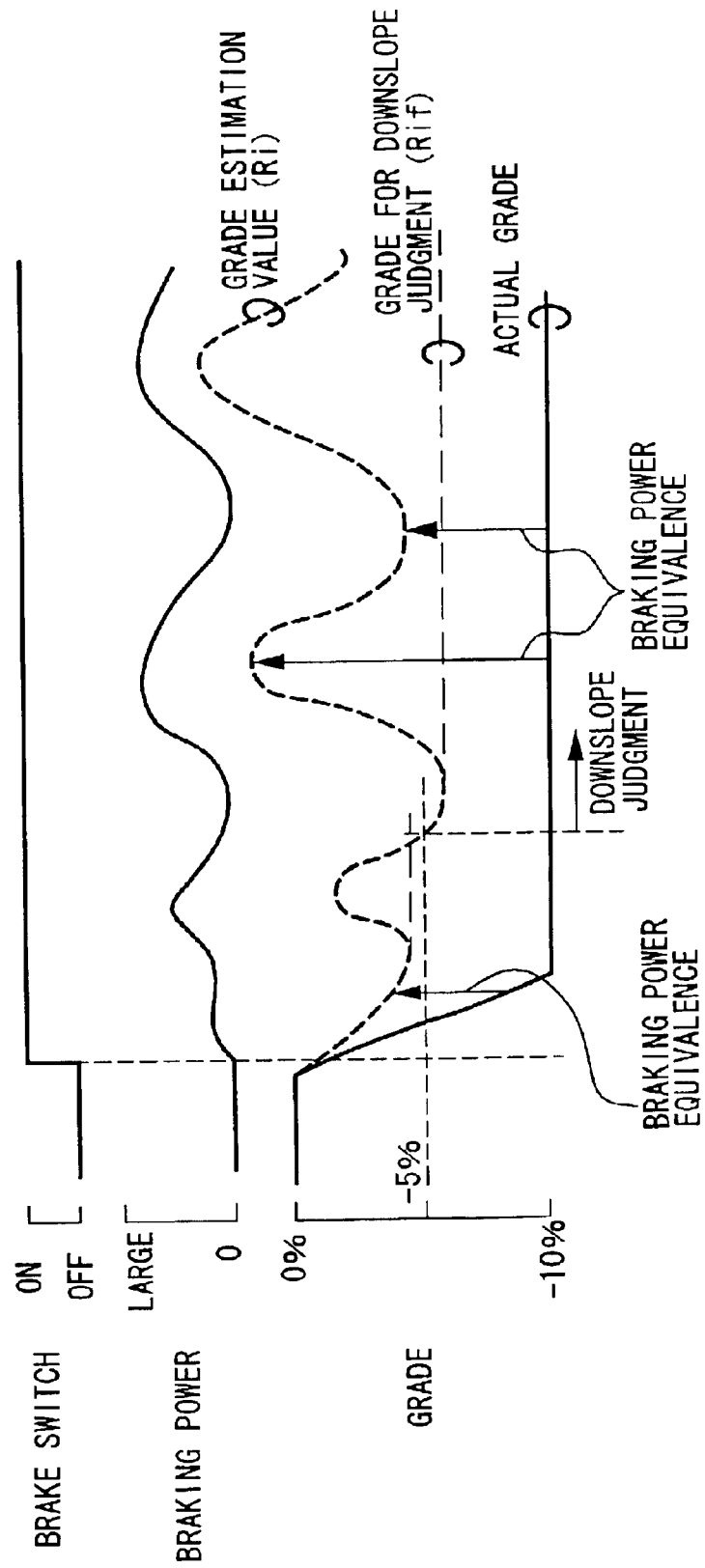

CONTROL APPARATUS AND CONTROL METHOD OF AUTOMATIC TRANSMISSION FOR VEHICLE

RELATED ART OF THE INVENTION

Heretofore, there has been a control apparatus of an automatic transmission for a vehicle, for setting a shift point based on grade resistance as disclosed in Japanese Unexamined Patent Publication No. 2000-035117.

FIELD OF THE INVENTION

The present invention relates to a control apparatus and a control method of an automatic transmission for a vehicle, for setting a shift point based on grade resistance of a running road surface.

In such an apparatus, when a brake operation (braking) is performed where there is caused an error in an estimation value of grade resistance, the shift point is set based on the grade resistance estimated before the brake operation.

In the conventional technique as described above, if a brake is operated during down-slope running, update of the estimation value of grade resistance is stopped.

Consequently, even in a case where a decline becomes steeper during the brake operation, leading a condition that a forcible downshift should be essentially performed, the shift point is determined on the basis of a comparatively gentle decline before the brake operation. As a result, there is caused a problem in that an appropriate downshift cannot be performed.

SUMMARY OF THE INVENTION

Therefore, the present invention has an object to enable to obtain an estimation result closer to actual grade resistance even when braking is performed where there is caused an error in an estimation value of grade resistance, thereby setting a more appropriate shift point.

In order to achieve the above object, the present invention has a constitution in that, when vehicle braking is performed, a minimum value of grade resistance calculated based on operating conditions of a vehicle is held, to set a shift point based on the held minimum value.

The other objects and features of this invention will become understood from the following description with reference to the accompanying drawings.

BRIEF EXPLANATION OF THE DRAWINGS

FIG. 3 is a time chart showing various parameters during down-slope running with braking.

DETAILED DESCRIPTION OF PREFERRED EMBODIMENT

Figure 1:
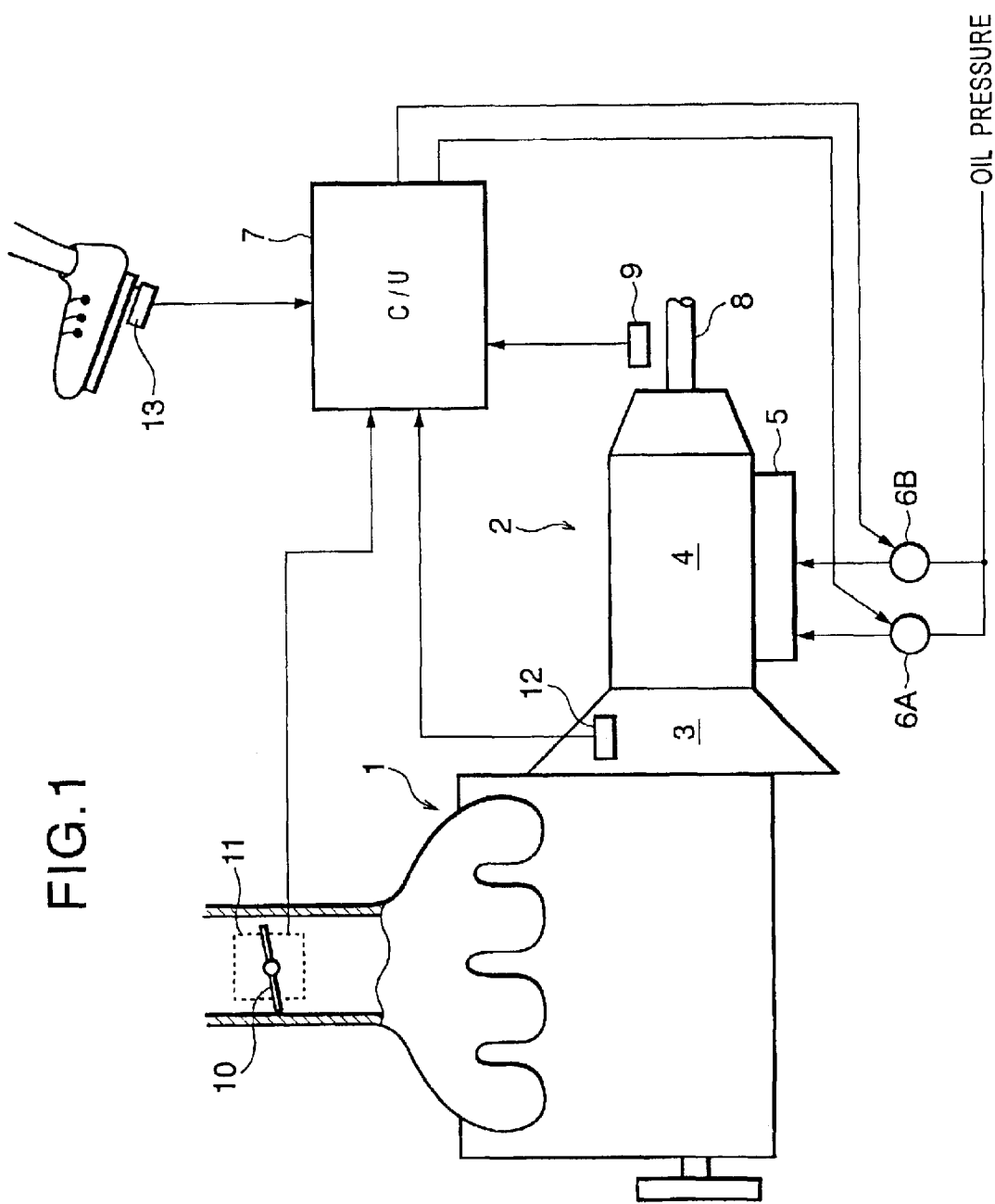
FIG. 1 is a diagram showing a system configuration of an automatic transmission for a vehicle in an embodiment.

FIG. 1 is a diagram showing a system configuration of an automatic transmission for a vehicle.

In FIG. 1, an automatic transmission 2 is connected to an output side of an engine 1.

Automatic transmission 2 comprises a torque converter 3, a gear type transmission 4, and a control valve 5 performing engagement/release operations of various friction engagement elements within gear type transmission 4.

Supply of operating oil pressure to control valve 5 is controlled by a shift solenoid, a line pressure solenoid, a lock-up solenoid and the like. Here, only shift solenoids 6A, 6B for shifting are shown in the figure.

A control unit 7 for controlling shift solenoids 6A, 6B receives signals from various sensors.

As various sensors, there are provided a vehicle speed sensor 9 receiving a rotation signal from an output shaft 8 of automatic transmission 2 to detect a vehicle speed VSP, a throttle sensor 11 detecting an opening TVO of a throttle valve 10 of engine 1, a turbine sensor 12 detecting a turbine rotation speed Nt of torque converter 3, a brake switch 13 that is turned ON when a foot brake is operated, and the like.

Control unit 7 refers to a basic shift point chart previously storing shift points corresponding to the vehicle speed VSP and the throttle opening TVO, and controls a combination of ON and OFF of shift solenoids 6A, 6B according to a shift point determined based on the basic shift point chart, to automatically control a change gear ratio in gear type transmission 4.

Further, during down-slope running of a vehicle, control unit 7 refers to a shift point chart for down-slope set so that the change gear ratio on a lower speed side is selected compared with the basic shift point chart.

Thus, during down-slope running, an appropriate downshift can be performed.

Figure 2:
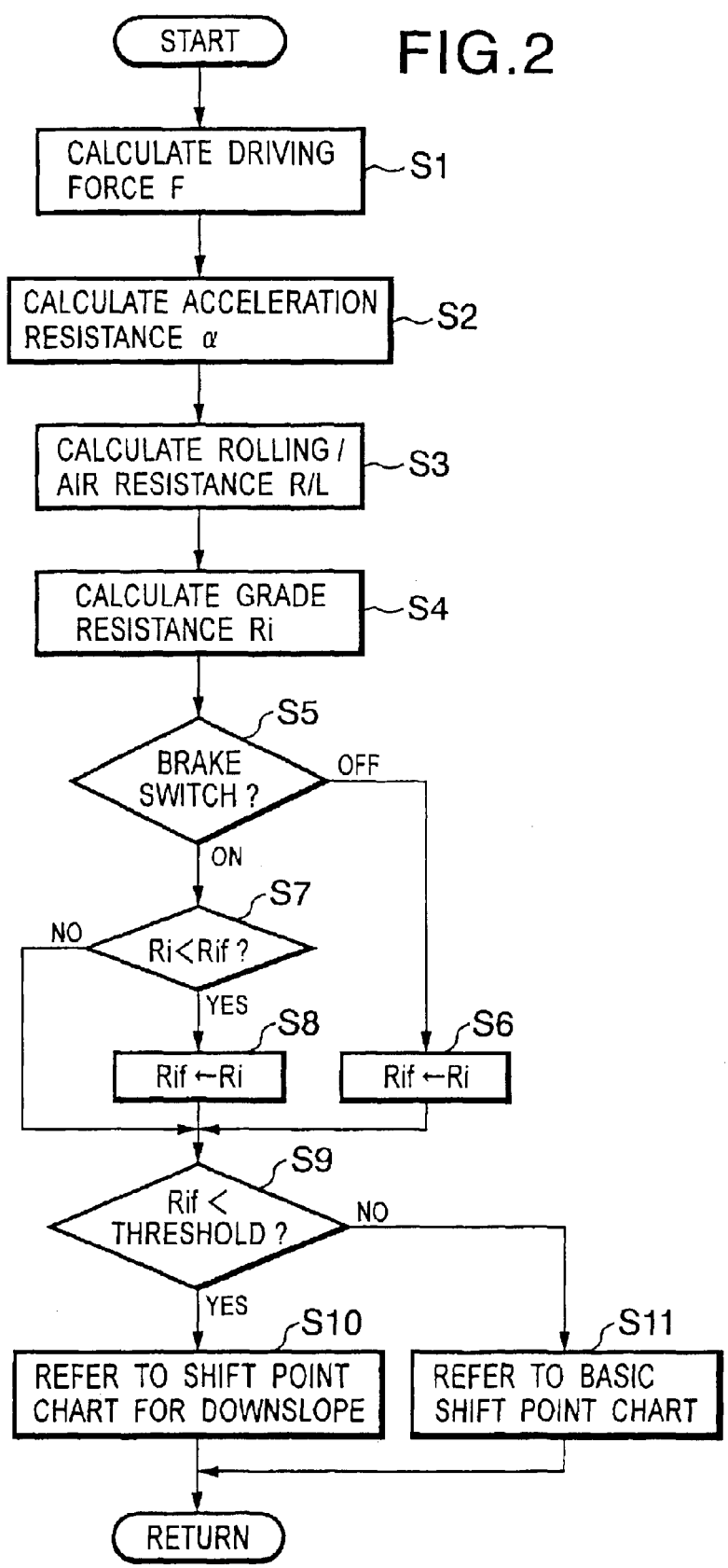
FIG. 2 is a flowchart showing a shift point control based on a down-slope judgment in the embodiment.

A flowchart of FIG. 2 shows a switching control to the shift point chart for down-slope.

In the flowchart of FIG. 2, at step S1, a driving force F of the vehicle is calculated.

The driving force F is calculated in accordance with the following equation, based on a turbine torque Tt calculated based on the throttle opening TVO and the turbine rotation speed Nt, a gear ratio RATIO in the change gear ratio at that time, and a constant k1 determined by a radius of a tire and the like.

$$F1 = Tt \times \text{RATIO} \times k1$$

At next step S2, acceleration resistance α is calculated.

The acceleration resistance α is calculated in accordance with the following equation, based on a change amount ΔVSP per unit time of the vehicle speed VSP, a vehicle weight W, and a constant k2.

$$\alpha = \Delta VSP \times W \times k2$$

At step S3, rolling/air resistance R/L is calculated based on the vehicle speed VSP at that time.

At step S4, grade resistance Ri is calculated in accordance with the following equation, based on the driving force F showing operating conditions of the vehicle, the acceleration resistance α, and the rolling/air resistance R/L.

$$Ri = F - \alpha - R/L$$

At step S5, it is judged whether brake switch 13 is ON or OFF.

If braking is not performed where brake switch 13 is OFF and a driver does not operate the foot brake, control proceeds to step S6.

At step S6, the grade resistance Ri calculated at step S4 is set to grade resistance Rif for down-slope judgment.

Accordingly, when braking is not performed, each time the grade resistance Ri is calculated, the grade resistance Rif for down-slope judgment is updated to the newest value, so that the grade resistance Ri=the grade resistance Rif for down-slope judgment.

At step S9, the grade resistance Rif for down-slope judgment and a minus threshold are compared with each other, to judge whether or not the grade resistance Rif is less than the threshold.

Then, when the grade resistance Rif is less than the threshold, that is, when the vehicle is running a down-slope of over a predetermined grade, control proceeds to step S10, where the shift point chart to be referred is switched to the one for down-slope.

When the grade resistance Rif is equal to or above the threshold, that is, when the vehicle is not running a steep down-slope, control proceeds to step S11, where the shift point chart to be referred is switched to the basic one.

On the other hand, if it is judged at step S5 that the braking is performed where brake switch 13 is ON and the driver operates the foot brake, control proceeds to step S7.

At step S7, the grade resistance Rif for down-slope judgment until the previous time and the grade resistance Ri calculated this time at step S4 are compared with each other.

Then, if the newest value of the grade resistance Ri is less than the grade resistance Rif for down-slope judgment until the previous time, control proceeds to step S8, where the newest value of the grade resistance Ri is set to the grade resistance Rif for down-slope judgment.

If the newest value of the grade resistance Ri is equal to or above the grade resistance Rif for down-slope judgment until the previous time, control proceeds to step S9 bypassing step S8, to hold the grade resistance Rif for down-slope judgment without updating.

Accordingly, when the braking is performed, the minimum value of the grade resistance Ri is peak held as the grade resistance Rif for down-slope judgment.

When the braking is performed and therefore control proceeds to step S9, as described above, the threshold and the grade resistance Rif to be held to the minimum value of the grade resistance Ri calculated after the braking judgment, are compared with each other, to determine which is to be referred to, the basic shift point chart or the shift point chart for down-slope.

FIG. 3 shows actual grade resistance, the grade resistance Ri estimated from the driving force F and the like, and the grade resistance Rif for down-slope judgment that is peak held to the minimum value, in the case where the vehicle runs, with braking, on the road surface in which a flat road is changed to a down-slope, and the down-slope becomes gradually steeper, thereafter a fixed down-slope is kept.

As shown in FIG. 3, a deviation between the actual grade resistance and the grade resistance Ri estimated from the driving force F and the like is caused by braking power of the brake, and the braking power of the brake causes an error in the estimation value on a plus side than the actual grade resistance.

Accordingly, when the braking is performed, even if the actual grade resistance is always less than the grade resistance Ri estimated from the driving force F and the like, and also, the grade is constant, a difference from an actual value is varied due to a variation of braking power. Thus, as the braking power is smaller, the grade resistance Ri estimated from the driving force F and the like becomes a small value close to the actual value.

Therefore, in the present embodiment, the minimum value among the grade resistance Ri calculated when the braking is performed, is held as a value most closest to the actual value, and based on the held value, it is judged whether or not the switching to the shift point chart for down-slope is performed.

According to the above constitution, compared with the case where the grade resistance Ri is held to a value before braking, it is possible to approximate the grade resistance Rif for down-slope to be used for switching judgment of the shift point chart, to the actual value. Thus, it is possible to suppress a delay of switching to the shift point chart for down-slope, to improve the drivability when down-slope running.

In the above embodiment, the constitution has been such that the shift point chart is switched to the one for down-slope when the down-slope is judged based on the grade resistance Ri. However, the constitution may be such that the vehicle speed is forcibly shifted down to third gear, under a condition that the vehicle speed is to be changed to fourth gear by the basic shift point chart. The switching to the shift point for down-slope is not limited to the switching of the shift point chart.

Moreover, the constitution may be such that, instead of the grade resistance, a grade "i" or an acceleration degree equivalent to the grade is calculated.

The entire contents of Japanese Patent Application No. 2001-397724 filed Dec. 27, 2001, a priority of which is claimed, are incorporated herein by reference.

While only selected embodiment has been chosen to illustrate the present invention, it will be apparent to those skilled in the art from this disclosure that various changes and modifications can be made herein without departing from the scope of the invention as defined in the appended claims.

Furthermore, the foregoing descriptions of the embodiment according to the present invention are provided for illustration only, and not for the purpose of limiting the invention as defined by the appended claims and their equivalents.

What is claimed are:

1. A control apparatus of an automatic transmission for a vehicle, comprising:

said automatic transmission;

an operating condition detector detecting operating conditions of said vehicle; and a control unit receiving a detection signal from said operating condition detector, and controlling a gear change of said automatic transmission based on said detection signal, wherein said control unit:

is constituted to calculate grade resistance of a running road surface based on the operating conditions of the vehicle, to set a shift point based on said grade resistance; and holds a minimum value of said calculated grade resistance when vehicle braking is performed, to set said shift point based on said held minimum value.

2. A control apparatus of an automatic transmission for a vehicle according to claim 1, further comprising;

a brake switch detecting an operation condition of a foot brake, wherein said control unit;

judges that vehicle braking is performed, based on a signal of said brake switch.

3. A control apparatus of an automatic transmission for a vehicle according to claim 1, wherein said control unit;

switches a normal shift point to a shift point for down-slope, when said grade resistance is less than a minus threshold.

4. A control apparatus of an automatic transmission for a vehicle according to claim 3, wherein said control unit;

previously stores a normal shift point chart and a shift point chart for down-slope, and switches the shift point chart for determining the shift point, from the normal shift point chart to the shift point chart for down-slope, when said grade resistance is less than the minus threshold.

5. A control apparatus of an automatic transmission for a vehicle according to claim 1,
wherein said control unit;
calculates said grade resistance based on a vehicle driving force, a vehicle acceleration resistance, and rolling/air resistance.

6. A control apparatus of an automatic transmission for a vehicle according to claim 5,
wherein said control unit;
calculates the vehicle driving force based on an input torque and a gear ratio of said automatic transmission.

7. A control apparatus of an automatic transmission for a vehicle according to claim 1,
wherein said control unit:
when vehicle braking is not performed, sets newest calculated grade resistance Ri to grade resistance Rif for determining the shift point; and
when vehicle braking is performed, sets the newest calculated grade resistance Ri to said grade resistance Rif if the newest calculated grade resistance Ri is less than said grade resistance Rif until the previous time, while holding said grade resistance Rif to a previous value if the newest calculated grade resistance Ri is equal to or above said grade resistance Rif until the previous time.

8. A control apparatus of an automatic transmission for a vehicle, comprising:
operating condition detecting means for detecting operating conditions of said vehicle;
grade resistance calculating means for calculating grade resistance of a running road surface based on said operating conditions;
braking judgment means for judging whether or not vehicle braking is performed; and
shift point setting means for setting a shift point based on the newest value of said grade resistance when vehicle braking is not performed, while holding a minimum value of said grade resistance to set the shift point based on said held minimum value when vehicle braking is performed.

9. A control method of an automatic transmission for a vehicle, for setting a shift point based on grade resistance of a running road surface, comprising the steps of:
detecting operating conditions of said vehicle;
calculating the grade resistance of the running road surface based on the operating conditions of the vehicle;
judging whether or not vehicle braking is performed;
setting the shift point based on the newest value of said grade resistance when vehicle braking is not performed; and
holding a minimum value of said calculated grade resistance to set the shift point based on said held minimum value when vehicle braking is performed.

10. A control method of an automatic transmission for a vehicle according to claim 9,
wherein said step of judging whether or not vehicle braking is performed, comprises the steps of:
receiving a signal of a brake switch for detecting an operating condition of a foot brake; and
judging whether or not vehicle braking is performed, based on the signal of said brake switch.

11. A control method of an automatic transmission for a vehicle according to claim 9,
wherein said step of setting the shift point based on the newest value of said grade resistance, and said step of setting the shift point based on said minimum value, comprise, respectively:
comparing said grade resistance with a minus threshold; and
switching a normal shift point to a shift point for down-slope, when said grade resistance is less than the minus threshold.

12. A control method of an automatic transmission for a vehicle according to claim 11,
wherein said step of switching the shift point comprises the steps of:
previously storing a normal shift point chart and a shift point chart for down-slope; and
switching the shift point chart for determining the shift point from the normal shift point chart to the shift point chart for down-slope, when said grade resistance is less than the minus threshold.

13. A control method of an automatic transmission for a vehicle according to claim 9,
wherein said step of calculating the grade resistance comprises the steps of:
calculating a vehicle driving force;
calculating a vehicle acceleration resistance;
calculating rolling/air resistance; and
calculating the grade resistance based on said vehicle driving force, said vehicle acceleration resistance and said rolling/air resistance.

14. A control method of an automatic transmission for a vehicle according to claim 13,
wherein said step of calculating the vehicle driving force comprises the steps of:
calculating an input torque of said automatic transmission; and
calculating the vehicle driving force based on said input torque and a gear ratio of said automatic transmission.

15. A control method of an automatic transmission for a vehicle according to claim 9,
wherein said step of setting the shift point based on said minimum value comprises the steps of:
comparing a previous value of grade resistance Rif for determining the shift point with the newest calculated grade resistance Ri when vehicle braking is performed;
setting the newest calculated grade resistance Ri to said grade resistance Rif when the newest calculated grade resistance Ri is less than said grade resistance Rif until the previous time;
holding said grade resistance Rif to the previous value when the newest calculated grade resistance Ri is equal to or above said grade resistance Rif until the previous time; and
setting the shift point based on said grade resistance Rif.

16. A control apparatus for an automatic transmission of a vehicle, comprising:
an operating condition detector configured to detect vehicle operating conditions; and
a control unit configured to receive a detection signal from said operating condition detector, and to provide control for an automatic transmission gear change based on said detection signal,
wherein said control unit is configured to calculate grade resistance of a running road surface based on the detected vehicle operating conditions; and
wherein, when braking is performed, said control unit is configured to hold a minimum value of said calculated grade resistance and to set a shift point based on said held minimum value.

* * * * *